United States Patent
Anderson et al.

(10) Patent No.: US 12,135,895 B2
(45) Date of Patent: Nov. 5, 2024

(54) HOT DATA MANAGEMENT IN A DATA STORAGE SYSTEM

(71) Applicant: Seagate Technology LLC, Fremont, CA (US)

(72) Inventors: Jack Vincent Anderson, Shakopee, MN (US); Jonathan Henze, Savage, MN (US); Ryan James Goss, Prior, MN (US); Charles McJilton, Longmont, CO (US); Jeremy Blair Goolsby, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/389,521

(22) Filed: Jul. 30, 2021

(65) Prior Publication Data

US 2023/0032639 A1    Feb. 2, 2023

(51) Int. Cl.
*G06F 3/06* (2006.01)
*G06F 21/60* (2013.01)

(52) U.S. Cl.
CPC .......... *G06F 3/065* (2013.01); *G06F 3/0611* (2013.01); *G06F 3/0679* (2013.01); *G06F 21/602* (2013.01)

(58) Field of Classification Search
CPC ...... G06F 3/065; G06F 3/0611; G06F 3/0679; G06F 21/602
See application file for complete search history.

(56) References Cited

U.S. PATENT DOCUMENTS

| | | | |
|---|---|---|---|
| 8,666,939 B2 | 3/2014 | O'Krafka et al. | |
| 8,726,044 B2 | 5/2014 | Hameed et al. | |
| 8,990,581 B2 | 3/2015 | Fiske et al. | |
| 9,256,381 B1 * | 2/2016 | Fultz | G06F 3/0617 |
| 9,318,166 B2 | 4/2016 | Sharon et al. | |
| 10,013,325 B1 * | 7/2018 | Garrett, Jr. | G06F 11/0727 |
| 10,230,809 B2 | 3/2019 | Raghunath et al. | |
| 2015/0106578 A1 | 4/2015 | Warfield et al. | |
| 2017/0242822 A1 | 8/2017 | Malladi et al. | |
| 2017/0371554 A1 | 12/2017 | Moon et al. | |
| 2020/0089424 A1 * | 3/2020 | Klein | G06F 11/1076 |

* cited by examiner

*Primary Examiner* — Eric Cardwell
(74) *Attorney, Agent, or Firm* — Hall Estill Law Firm

(57) ABSTRACT

A data storage system may store a first data block having a first data configuration generated by a host in a non-volatile memory that is connected to a data module. A data strategy may be generated with the data module in response to the storage of data with the data strategy consisting of at least one trigger associated with identifying the first data block as hot. The first data block can be replicated to a different memory location with a second data configuration as directed by the data strategy with the first data configuration being different than the second data configuration.

20 Claims, 6 Drawing Sheets

HOT DATA MANAGEMENT IN A DATA STORAGE SYSTEM

CROSS-REFERENCE TO RELATED APPLICATIONS

This application claims benefit under 35 U.S.C. 119(e) of U.S. Provisional Application Ser. No. 67/706,107, filed Jul. 31, 2020, which is hereby expressly incorporated herein by reference in its entirety.

SUMMARY

Various embodiments of the present disclosure are generally directed to the management of data in a memory, such as, but not limited to, a flash memory in a solid state drive (SSD).

A data storage system, in some embodiments, has a non-volatile memory connected to a controller of a data module with the controller generating a data strategy in response to storage of data in the non-volatile memory. The data strategy consists of at least one trigger associated with identifying data stored in the non-volatile memory as hot and directs the replication of the hot data to a different memory location.

Other embodiments of a data storage system store a first data block having a first data configuration generated by a host in a non-volatile memory that is connected to a data module. A data strategy generated with the data module in response to the storage of data with the data strategy consists of at least one trigger associated with identifying the first data block as hot. The first data block is replicated to a different memory location with a second data configuration as directed by the data strategy with the first data configuration being different than the second data configuration.

In accordance with various embodiments, a data storage system stores a first data block generated by a host in a non-volatile memory connected to a data module. A data strategy is generated with the data module in response to the storage of data with the data strategy consisting of at least one trigger associated with identifying the first data block as hot. The data strategy directs the replication of the first data block to a different memory location prescribed by the data strategy to balance a data storage load on the non-volatile memory.

In accordance with further embodiments, a data storage system has a write manager that replicates write data to two different locations in a non-volatile memory in response to hot data assignment by a hot data module with a first copy of the write data having a first error correction code and a second copy of the write data having a second error correction code. A read manager initiates a first read operation in an effort to retrieve the first copy of write data in response to a read command from the host before aborting the effort to retrieve the first copy of the write data and retrieving the second copy of the write data in response to an encountered error.

DETAILED DESCRIPTION

Figure 1:
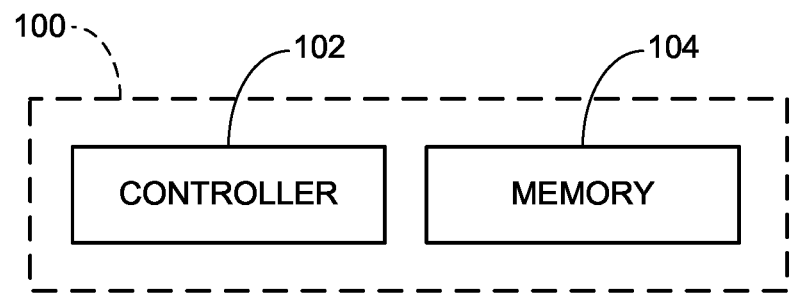
FIG. 1 provides a functional block representation of a data storage device in accordance with various embodiments.

Without limitation, the various embodiments disclosed herein are generally directed to managing data access commands in a distributed data storage system to mitigate the impact of various conditions on data access performance.

Solid state drives (SSDs) are data storage devices that store user data in non-volatile memory (NVM) made up of an array of solid-state semiconductor memory cells. SSDs usually have an NVM module and a controller. The controller controls the transfer of data between the NVM and a host device. The NVM will usually be NAND flash memory, but other forms of solid-state memory can be used.

A flash memory module may be arranged as a series of dies. A die represents a separate, physical block of semiconductor memory cells. The controller communicates with the dies using a number of channels, or lanes, with each channel connected to a different subset of the dies. Any respective numbers of channels and dies can be used. Groups of dies may be arranged into NVMe sets in accordance with the NVMe (Non-Volatile Memory Express) Standard. This standard enables multiple owners (users) to access and control separate portions of a given SSD (or other memory device).

Metadata is often generated and used to describe and control the data stored to an SSD. The metadata may take the form of one or more map structures that track the locations of data blocks written to various GCUs (garbage collection units), which are sets of erasure blocks that are erased and allocated as a unit. The map structures can include a forward map and a reverse directory, although other forms can be used.

The forward map provides an overall map structure that can be accessed by a controller to service a received host access command (e.g., a write command, a read command, etc.). The forward map may take the form of a two-level map, where a first level of the map maintains the locations of map pages and a second level of the map provides a flash transition layer (FTL) to provide association of logical addresses of the data blocks to physical addresses at which the blocks are stored. Other forms of maps can be used including single level maps and three-or-more level maps, but each generally provides a forward map structure in which pointers may be used to point to each successive block until the most current version is located.

The reverse directory can be written to the various GCUs and provides local data identifying, by logical address, which data blocks are stored in the associated GCU. The reverse directory, also sometimes referred to as a footer, thus provides a physical to logical association for the locally stored blocks. As with the forward map, the reverse directory can take any number of suitable forms. Reverse directories are particularly useful during garbage collection operations, since a reverse directory can be used to determine which data blocks are still current and should be relocated before the associated erasure blocks in the GCU are erased.

SSDs expend a significant amount of resources on maintaining accurate and up-to-date map structures. Nevertheless, it is possible from time to time to have a mismatch between the forward map and the reverse directory for a given GCU. These situations are usually noted at the time of garbage collection. For example, the forward map may indicate that there are X valid data blocks in a given erasure block (EB), but the reverse directory identifies a different number Y valid blocks in the EB. When this type of mismatch occurs, the garbage collection operation may be rescheduled or may take a longer period of time to complete while the system obtains a correct count before proceeding with the recycling operation.

The NVMe specification provides that a storage device should have the ability to provide guaranteed levels of deterministic performance for specified periods of time (deterministic windows, or DWs). To the extent that a garbage collection operation is scheduled during a DW, it is desirable to ensure that the actual time that the garbage collection operation would require to complete is an accurate estimate in order for the system to decide whether and when to carry out the GC operation.

SSDs include a top level controller circuit and a flash (or other semiconductor) memory module. A number of channels, or lanes, are provided to enable communications between the controller and dies within the flash memory. The dies are further subdivided into planes, GCUs, erasure blocks, pages, etc. Groups of dies may be arranged into separate NVMe sets, or namespaces. This allows the various NVMe sets to be concurrently serviced for different owners (users).

In one nonlimiting example, a 4 TB SSD has 128 die connected using 8 channels so that 16 die are connected to each channel. Each die has two planes that support concurrent read or write operations to the same page number (but not necessarily the same erasure blocks, EBs). GCUs nominally are formed using one EB from each of 32 dies. Each page stores 16K of data plus LDPC inner code values. GCU writes are thus formed by writing (nominally) 31 pages of user data, and one page of parity (XOR) data. This will support a loss of a single die. EBs represent the smallest increment of memory that can be erased as a unit, but in practice, garbage collection takes place at the GCU level.

Flash devices can be noisy and thus it is common to write data in the form of code words to individual pages of data. A page may store 16K worth of user payload data, plus some additional number of LDPC (low density parity check) codes, which may be on the order of an additional 5K or so bits. The number and strength of the LDPC codes are used to enable, normally, correct reading back of the payload. Outercode, or parity values, can additionally be written as noted above to correct read errors when the inner code values are insufficient to resolve the error.

While the ability to correct errors can be incorporated into data stored in a memory, the actual recovery of data after an encountered error can be detrimental to the data access and storage performance of a data storage system. That is, the discovery of an error and subsequent actions to allow data associated with the error to be recovered occupy time and system resources that would otherwise be available to satisfy data access requests from one or more hosts. The presence of numerous different data access requests from several different hosts can exacerbate the frequency of errors as well as the data access performance degradation corresponding to recovering the data and/or data locations that encountered an error. With the structural configuration of flash memory, as well as other solid-state memories, that access multiple memory locations via a single bit line, such as a page of memory, an error to a single memory location restricts, or at least delays, access to the remaining memory locations of the bit line until the error is recovered.

In the past, data stored in error-prone memory locations can be copied so that a valid copy of data can be returned to a requesting host in the event of an error. However, the static copying of data can occupy valuable memory real estate while contributing to excess memory usage that lowers the usable lifespan of the memory. The use of unintelligent data copying can further create complex garbage collection and data association operations as data is updated, which renders past copies stale. Hence, the copying of data based on how error-prone a memory location is can create as many practical difficulties as it solves.

Accordingly, assorted embodiments of a distributed data storage system intelligently copy data identified as subject to future operational data access errors in order to provide the ability to efficiently substitute a copy of requested data in the event of an error, but without crippling the operational efficiency of a memory with excessive volumes of copied data. By intelligently identifying and copying data, assorted circuitry of a data storage device, and collective data storage system, can provide seamless operational data access efficiency despite encountered errors. Meanwhile, data that is intelligently copied can be kept discrete with minimal impact on the storage capacity, complexity, and access performance of individual devices and the distributed data storage system as a whole.

These and other features may be practiced in a variety of different data storage devices, but various embodiments conduct wear range optimization in the example data storage device 100 shown as a simplified block representation in FIG. 1. The device 100 has a controller 102 and a memory module 104. The controller block 102 represents a hardware-based and/or programmable processor-based circuit configured to provide top level communication and control functions. The memory module 104 includes solid state non-volatile memory (NVM) for the storage of user data from one or more host devices 106, such as other data storage devices, network server, network node, or remote controller.

Figure 2:
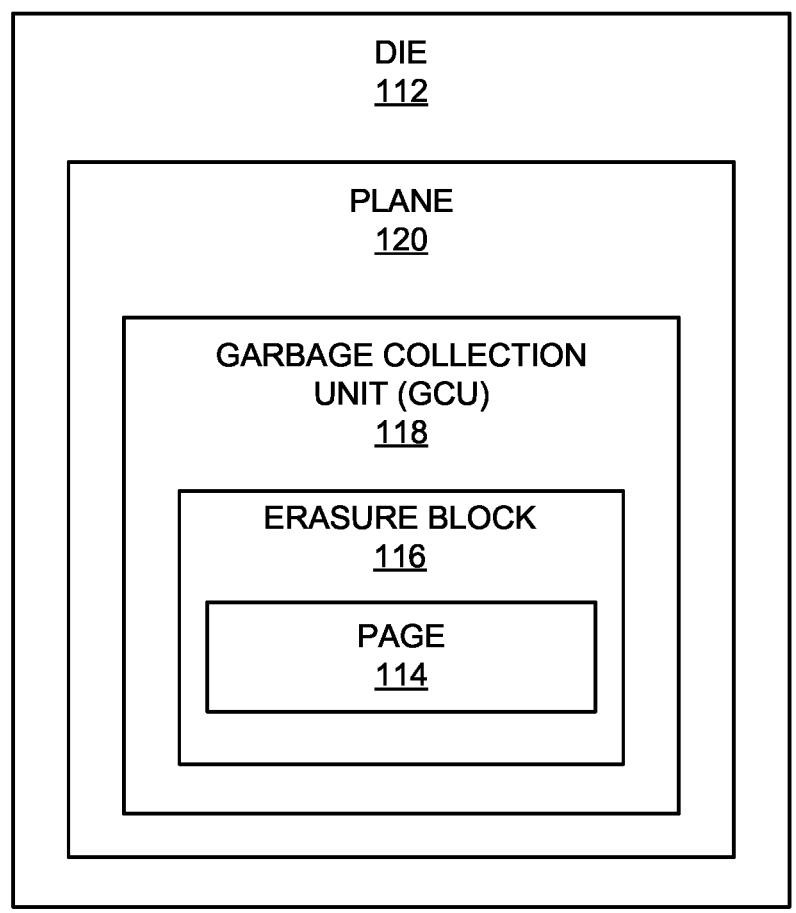
FIG. 2 shows aspects of the device of FIG. 1 characterized as a solid state drive (SSD) in accordance with some embodiments.

FIG. 2 shows a block representation of portions of an example memory 110 arranged in accordance with some embodiments. A memory die 112 can be configured with any solid-state memory cells, such as flash, resistive, phase change, and spin-torque memory, without limitation. The smallest unit of memory that can be accessed at a time is referred to as a page 114. A page 114 may be formed using a number of solid-state memory cells that share a common word line, bit line, or source line. The storage size of a page 114 can vary; current generation flash memory pages can store, in some cases, 16 KB (16,384 bytes) of user data.

A number of pages are integrated into an erasure block 116, which represents the smallest grouping of memory cells that can be concurrently erased in a NAND flash memory. A number of erasure blocks 116 can be arranged into a garbage collection unit (GCU) 118, which may utilize erasure blocks across different dies 112, as explained below. GCUs 118 can be allocated for the storage of data. Once a sufficient amount of the stored data is determined to be stale (e.g., no longer the most current version), a garbage collection operation can be carried out to recycle the GCU 118. This includes identifying and relocating the current version data to a new location, followed by an erasure operation to reset the memory cells. The GCU 118 may then be returned to an allocation pool for subsequent allocation to begin storing new user data.

Each die 112 may include a plurality of planes 120. Examples include two planes per die, four planes per die, etc. although other arrangements can be used. Generally, a plane is a subdivision of the die 112 arranged with separate read/write/erase circuitry such that a given type of access operation (such as a write operation, etc.) can be carried out simultaneously by each of the planes to a common page address within the respective planes.

Figure 3:
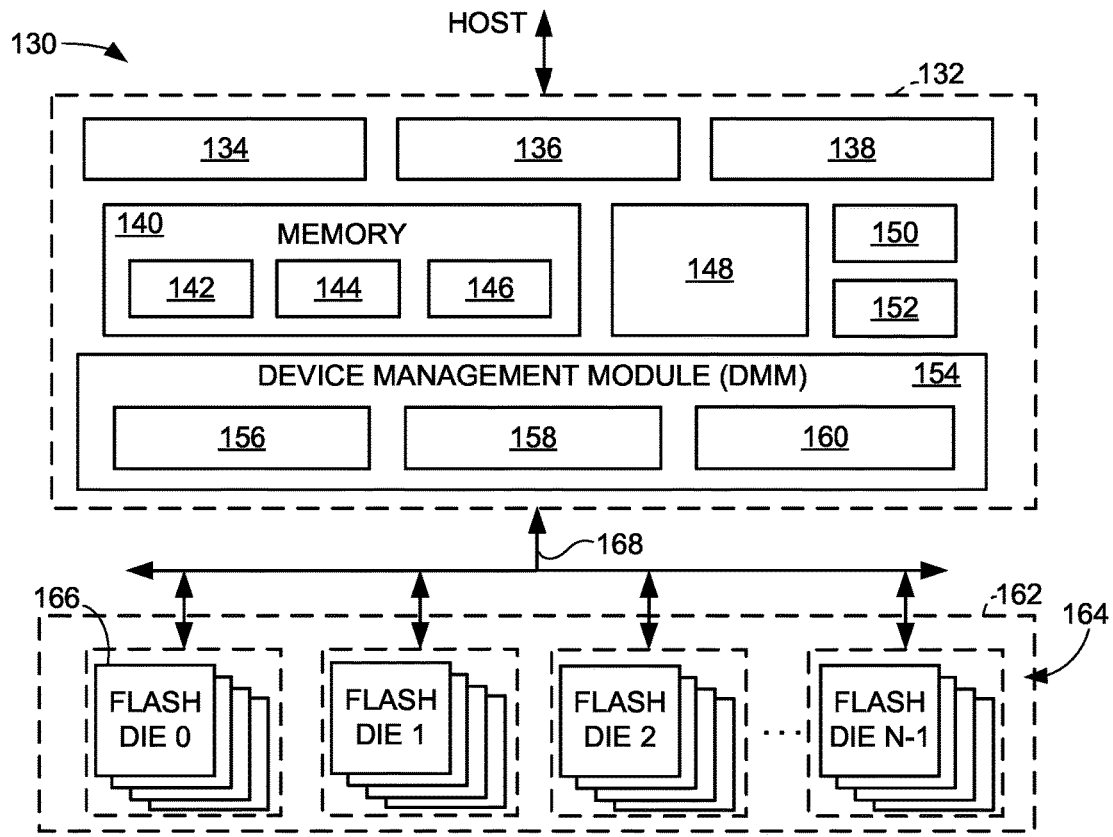
FIG. 3 shows an arrangement of the flash memory of FIG. 2 in some embodiments.

FIG. 3 depicts portions of an example data storage device 130 generally corresponding to the device 100 in FIG. 1. The device 130 is configured as a solid state drive (SSD) that communicates with one or more host devices via one or more Peripheral Component Interface Express (PCIe) ports, although other configurations can be used. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate NVMe sets (die sets) for use in the storage of data. Each NVMe set may form a portion of an NVMe Namespace that may span multiple SSDs or be contained within a single SSD.

The SSD 130 includes a controller circuit 132 with a front end controller 134, a core controller 136 and a back end controller 138. The front end controller 134 performs host I/F functions, the back end controller 138 directs data transfers with the memory module 134 and the core controller 136 provides top level control for the device.

Each controller 134, 136 and 138 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 140 represents various forms of volatile and/or non-volatile memory (e.g., SRAM, DDR DRAM, flash, etc.) utilized as local memory by the controller 132. Various data structures and data sets may be stored by the memory including one or more map structures 142, one or more caches 144 for map data and other control information, and one or more data buffers 146 for the temporary storage of host (user) data during data transfers.

A non-processor based hardware assist circuit 148 may enable the offloading of certain memory management tasks by one or more of the controllers as required. The hardware circuit 148 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 132, such as a data compression block 150 and an encryption block 152. The data compression block 150 applies lossless data compression to input data sets during write operations, and subsequently provides data de-compression during read operations. The encryption block 152 provides any number of cryptographic functions to input data including encryption, hashes, decompression, etc.

A device management module (DMM) 154 supports back end processing operations and may include an outer code engine circuit 156 to generate outer code, a device I/F logic circuit 158 and a low density parity check (LDPC) circuit 160 configured to generate LDPC codes as part of the error detection and correction strategy used to protect the data stored by the by the SSD 130.

A memory module 162 corresponds to the memory 104 in FIG. 1 and includes a non-volatile memory (NVM) in the form of a flash memory 164 distributed across a plural number N of flash memory dies 166. Rudimentary flash memory control electronics (not separately shown in FIG. 3) may be provisioned on each die 166 to facilitate parallel data transfer operations via one or more channels (lanes) 168.

Figure 4:
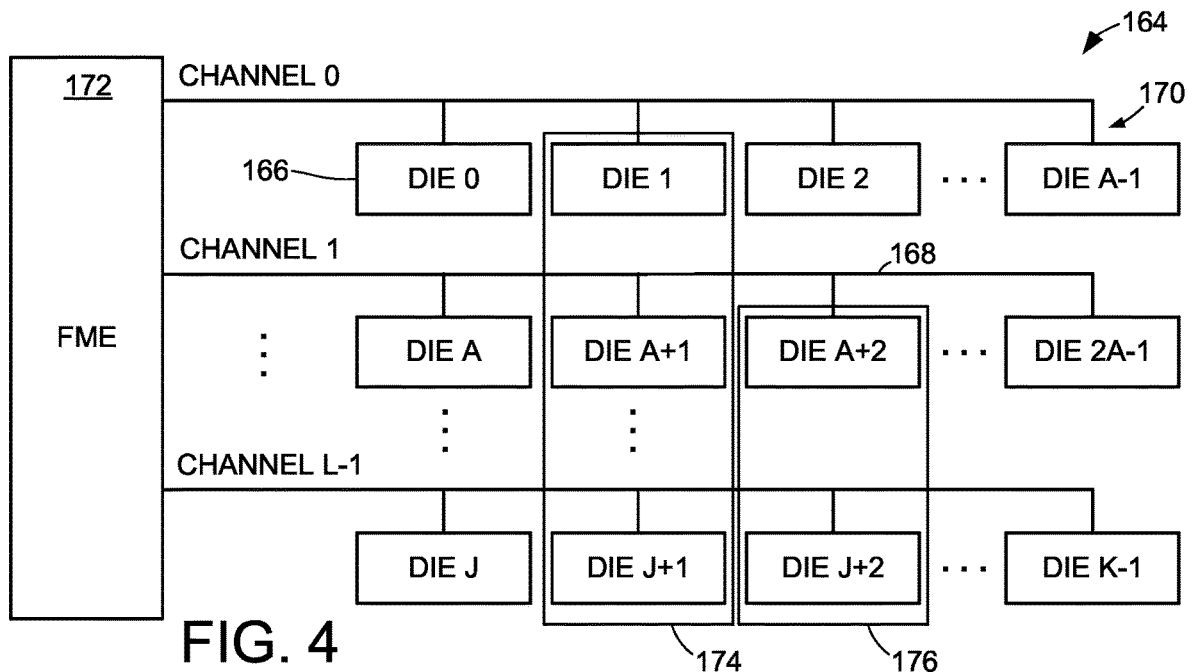
FIG. 4 illustrates the use of channels to access the dies in FIG. 3 in some embodiments.

FIG. 4 shows further aspects of the flash memory 164 arranged in accordance with some embodiments. A total number K dies 166 are provided and arranged into physical die groups 170. Each die group 170 is connected to a separate channel 168 using a total number of L channels. In one example, K is set to 128 dies, L is set to 8 channels, and each physical die group has 16 dies. As noted above, a single die within each physical die group can be accessed at a time using the associated channel. A flash memory electronics (FME) circuit 172 of the flash memory 164 controls each of the channels 168 to transfer data to and from the dies 166.

In some embodiments, the various dies are arranged into one or more NVMe sets. An NVMe set represents a portion of the storage capacity of the SSD that is allocated for use by a particular host (user/owner). NVMe sets are usually established with a granularity at the die level, so that some percentage of the total available dies 166 will be allocated for incorporation into a given NVMe set.

A first example NVMe set is denoted at 174 in FIG. 4. This first set 174 uses a single die 166 from each of the different channels 168. This arrangement provides fast performance during the servicing of data transfer commands for the set since all eight channels 168 are used to transfer the associated data. A limitation with this approach is that if the set 174 is being serviced, no other NVMe sets can be serviced during that time interval. While the set 174 only uses a single die from each channel, the set could also be configured to use multiple dies from each channel, such as 16 dies/channel, 32 dies/channel, etc.

A second example NVMe set is denoted at 176 in FIG. 4. This set uses dies 166 from less than all of the available channels 168. This arrangement provides relatively slower overall performance during data transfers as compared to the set 174, since for a given size of data transfer, the data will be transferred using fewer channels. However, this arrangement advantageously allows the SSD to service multiple NVMe sets at the same time, provided the sets do not share the same (e.g., an overlapping) channel 168.

Figure 5:
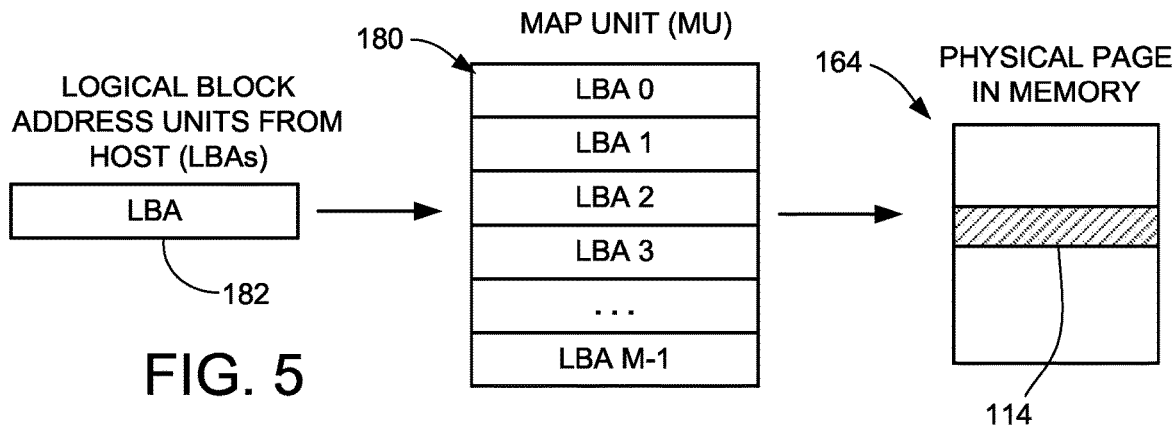
FIG. 5 illustrates a map unit (MU) as a data arrangement stored to the flash memory of FIG. 2.

FIG. 5 illustrates a manner in which data may be stored to a flash memory 164. Map units (MUs) 180 represent fixed sized blocks of data that are made up of one or more user logical block address units (LBAs) 182 supplied by the host. Without limitation, the LBAs 182 may have a first nominal size, such as 512 bytes (B), 1024B (1 KB), etc., and the MUs 180 may have a second nominal size, such as 4096B (4 KB), etc. The application of data compression may cause each MU to have a smaller size in terms of actual bits written to the flash memory 164.

The MUs 180 are arranged into the aforementioned pages 114 (FIG. 2) which are written to the memory 164. In the present example, using an MU size of 4 KB, then nominally four (4) MUs may be written to each page. Other configurations can be used. To enhance data density, multiple pages worth of data may be written to the same flash memory cells connected to a common control line (e.g., word line) using multi-bit writing techniques; MLCs (multi-level cells) write two bits per cell, TLCs (three-level cells) write three bits per cell; XLCs (four level cells) write four bits per cell, etc.

Data stored by an SSD are often managed using metadata. The metadata provide map structures to track the locations of various data blocks (e.g., MUAs 180) to enable the SSD 130 to locate the physical location of existing data. For example, during the servicing of a read command it is generally necessary to locate the physical address within the flash memory 166 at which the most current version of a requested block (e.g., LBA) is stored, so that the controller can schedule and execute a read operation to return the requested data to the host. During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 6:
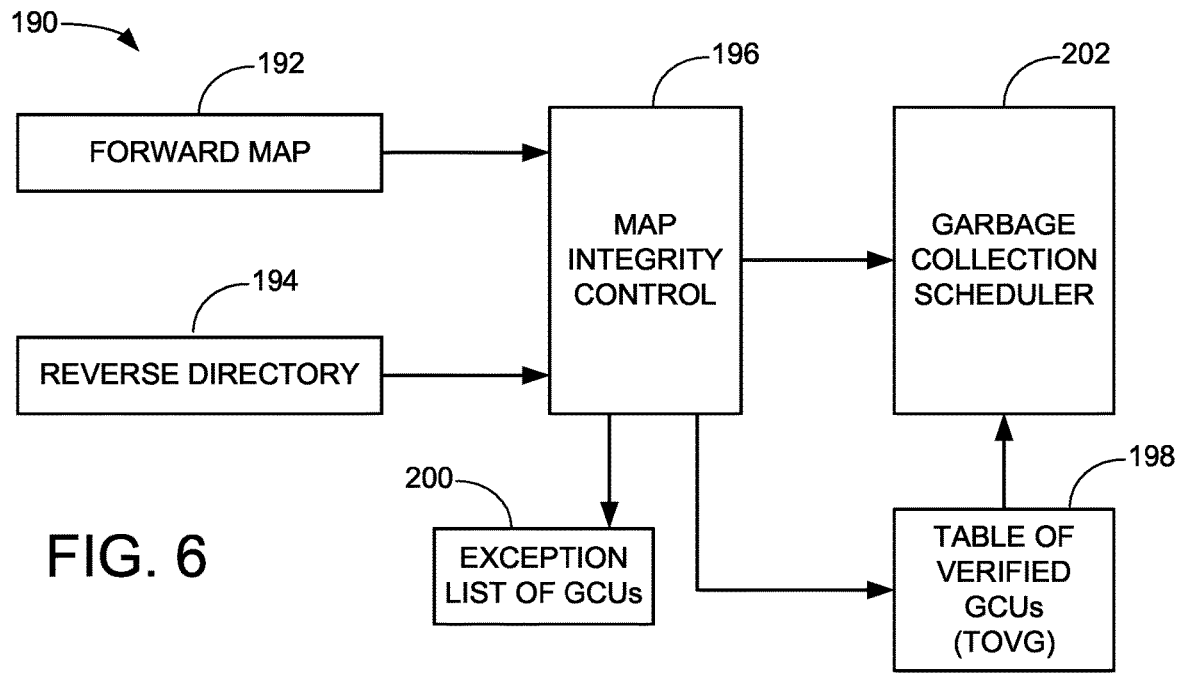
FIG. 6 displays a functional block diagram for a GCU management circuit of the SSD in accordance with some embodiments.

FIG. 6 shows a functional block diagram for a GCU management circuit 190 of the SSD 130 in accordance with some embodiments. The circuit 190 may form a portion of the controller 132 and may be realized using hardware circuitry and/or one or more programmable processor circuits with associated firmware in memory. The circuit 190 includes the use of a forward map 192 and a reverse directory 194. As noted above, the forward map and reverse directory are metadata data structures that describe the locations of the data blocks in the flash memory 164. During the servicing of host data transfer operations, as well as other operations, the respective portions of these data structures are located in the flash memory or other non-volatile memory location and copied to local memory 140 (see e.g., FIG. 3).

The forward map 192 provides a flash transition layer (FTL) to generally provide a correlation between the logical addresses of various blocks (e.g., MUAs) and the physical addresses at which the various blocks are stored (e.g., NVMe set, die, plane, GCU, EB, page, bit offset, etc.). The contents of the forward map 192 may be stored in specially configured and designated GCUs in each NVMe set.

The reverse directory 194 provides a physical address to logical address correlation. The reverse directory contents may be written as part of the data writing process to each GCU, such as in the form of a header or footer along with the data being written. Generally, the reverse directory provides an updated indication of how many of the data blocks (e.g., MUAs) are valid (e.g., represent the most current version of the associated data).

The circuit 190 further includes a map integrity control circuit 196. As explained below, this control circuit 196 generally operates at selected times to recall and compare, for a given GCU, the forward map data and the reverse directory data. This evaluation step includes processing to determine if both metadata structures indicate the same number and identify of the valid data blocks in the GCU.

If the respective forward map and reverse directory match, the GCU is added to a list of verified GCUs in a data structure referred to as a table of verified GCUs, or TOVG 198. The table can take any suitable form and can include a number of entries, with one entry for each GCU. Each entry can list the GCU as well as other suitable and useful information, such as but not limited to a time stamp at which the evaluation took place, the total number of valid data blocks that were determined to be present at the time of validation, a listing of the actual valid blocks, etc.

Should the control circuit 196 find a mismatch between the forward map 192 and the reverse directory 194 for a given GCU, the control circuit 196 can further operate to perform a detailed evaluation to correct the mismatch. This may include replaying other journals or other data structures to trace the history of those data blocks found to be mismatched. The level of evaluation required will depend on the extent of the mismatch between the respective metadata structures.

For example, if the forward map 192 indicates that there should be some number X valid blocks in the selected GCU, such as 12 valid blocks, but the reverse directory 194 indicates that there are only Y valid blocks, such as 11 valid blocks, and the 11 valid blocks indicated by the reverse directory 194 are indicated as valid by the forward map, then the focus can be upon the remaining one block that is valid according to the forward map but invalid according to the reverse directory. Other mismatch scenarios are envisioned.

The mismatches can arise due to a variety of factors such as incomplete writes, unexpected power surges or disruptions that prevent a full writing of the state of the system, etc. Regardless, the control circuit can expend the resources as available to proactively update the metadata. In some embodiments, an exception list 200 may be formed as a data structure in memory of GCUs that have been found to require further evaluation. In this way, the GCUs can be evaluated later at an appropriate time for resolution, after which the corrected GCUs can be placed on the verified list in the TOVG 198.

It will be noted that the foregoing operation of the control circuit 196 in evaluating GCUs does not take place once a garbage collection operation has been scheduled; instead, this is a proactive operation that is carried out prior to the scheduling of a garbage collection operation. In some cases, GCUs that are approaching the time at which a garbage collection operation may be suitable, such as after the GCU has been filled with data and/or has reached a certain aging limit, etc., may be selected for evaluation on the basis that it can be expected that a garbage collection operation may be necessary in the relatively near future.

FIG. 6 further shows the GCU management circuit 190 to include a garbage collection scheduler circuit 202. This circuit 202 generally operates once it is appropriate to consider performing a garbage collection operation, at which point the circuit 202 selects from among the available verified GCUs from the table 198. In some cases, the circuit 202 may generate a time of completion estimate to complete the garbage collection operation based on the size of the GCU, the amount of data to be relocated, etc.

As will be appreciated, a garbage collection operation can include accessing the forward map and/or reverse directory 192, 194 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 7:
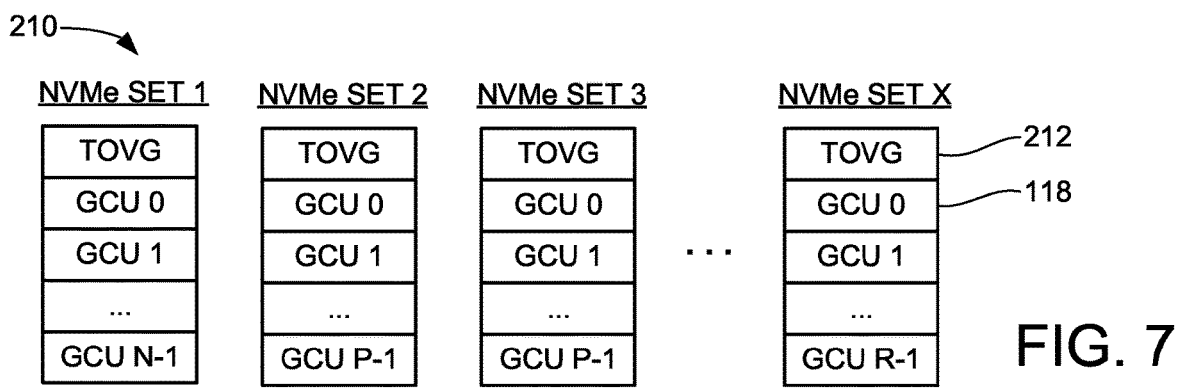
FIG. 7 represents an arrangement of various GCUs and corresponding tables of verified GCUs (TOVGs) for a number of different NVMe sets in some embodiments.

FIG. 7 shows a number of NVMe sets 210 that may be arranged across the SSD 130 in some embodiments. Each set 210 may have the same nominal data storage capacity (e.g., the same number of allocated dies, etc.), or each may have a different storage capacity. The storage capacity of each NVMe set 210 is arranged into a number of GCUs 118 as shown. In addition, a separate TOVG (table of verified GCUs) 212 may be maintained by and in each NVMe set 210 to show the status of the respective GCUs. From this, each time that it becomes desirable to schedule a garbage collection operation, such as to free up new available memory for a given set, the table 212 can be consulted to select a GCU that, with a high degree of probability, can be subjected to an efficient garbage collection operation without any unexpected delays due to mismatches in the metadata (forward map and reverse directory).

Figure 8:
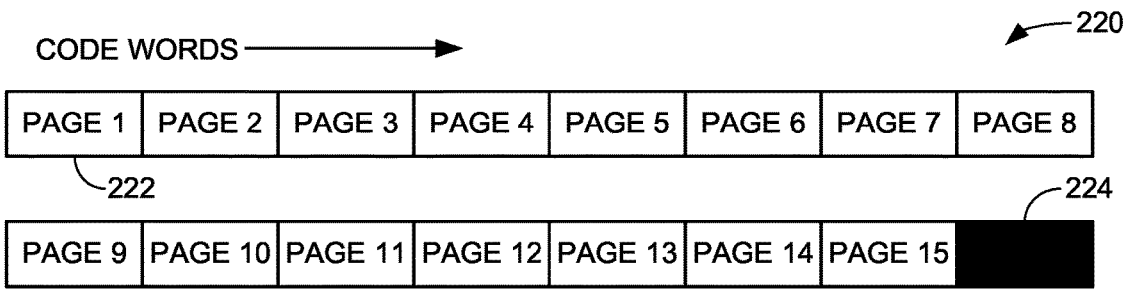
FIG. 8 illustrates an example data set that can be written to the data storage device of FIG. 1 in accordance with assorted embodiments.

FIG. 8 illustrates a manner in which a parity data set 220 can be written to a selected GCU 118 in the flash memory 164 in accordance with some embodiments. In this example, it is contemplated that the selected GCU 118 is formed from sixteen (16) erasure blocks 116, with each of the erasure blocks disposed on a different die 166. Other sizes can be used as desired.

In FIG. 8, the parity data set has fifteen (15) user data pages 222, with each user data page, or payload, written to a different one of the dies. More generally, the GCU has N erasure blocks on a corresponding N dies, and payloads 222 are written to N−1 of the dies. The Nth die receives an outer code (parity value), which is represented at 224. As mentioned above, the outer code may be generated by summing the page data in a buffer using an XOR function. Because the parity data set 220 has data boundaries that nominally match the GCU boundaries, the parity data set in FIG. 8 is referred to as a standard parity data set since the data matches the available memory.

Figure 9:
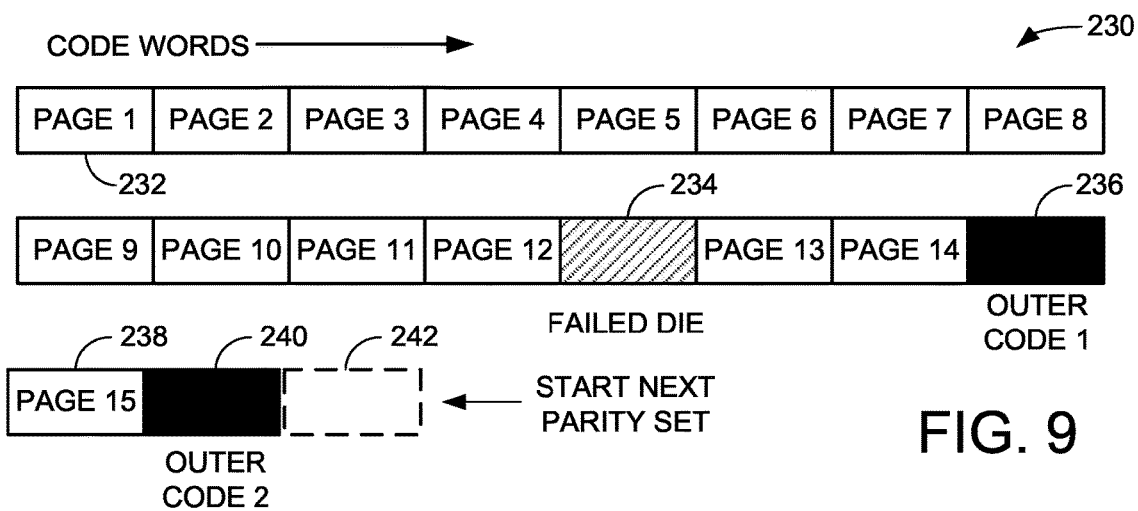
FIG. 9 is an example non-standard data set that may occur in the data storage device of FIG. 1 in accordance with various embodiments.

FIG. 9 shows an example non-standard parity data set 230. The parity data set 230 is the same size as the parity data set 220 in FIG. 8 in that, as before, the parity data set 230 has a total of fifteen (15) pages/payloads 232. However, one of the dies 166 has experienced a failure, as indicated at 234, so that the GCU only spans 15 dies.

Accordingly, the controller circuit 132 (FIG. 3) operates to write a full set of the available pages, which in this case is Page 1 to Page 14, through the available dies. This is followed by the writing of a first outer code (parity value) in the Nth location, as shown at 236, which protects the payloads (Page 1 to Page 14) written during this first pass through the available dies.

A leftover payload 238 (Page 15) is written to the next available page in the first die (such as adjacent Page 1). This leftover payload is referred to as a runt or runt data, and represents the remainder after an integer number of passes have been made through the available dies. Once all of the leftover payloads have been written, a second outer code (parity value) is written in the next available die, as shown at 240. This second outer code is disposed in the same die as, and is adjacent to, the Page 2 payload.

In this way, when leftover (runt) payload sets remain, these are written to as many additional dies as are required, followed by the writing of a final parity value to cover the runts. Map data may be generated to note the non-standard outer code arrangement. This provides a parity data set with a parity value to protect each pass through the dies, plus another parity value to cover the remainder.

While FIG. 9 shows the non-standard parity data set has arisen due to a non-standard sized available memory (e.g., due to the die failure at 234), other non-standard parity data sets can arise based on other factors. For example, a particular data set to be written to a given NVMe set may make up a total number of MUs that do not align with the GCU boundaries. In another case, data compression or other processing may result in a non-standard sized parity data set. It will be appreciated that if a given GCU has N dies, then a non-standard sized data set will have a total number M payloads (or portions thereof) that are not divisible by N without a remainder. The remainder could be any value from one extra payload up to N−1 extra payloads. Regardless, each pass through the dies will be parity protected, irrespective of the overall length of the parity data set.

Once a non-standard parity set is written, map data may be generated and stored to indicate the fact that the parity data set is of non-standard length. Information may be stored in the map data such as how much longer the data set is in terms of additional pages in the remainder, the location of the last parity value (e.g., 240), etc. To maximize data density, the controller may operate to initiate the writing of the next parity data set at the next available page on the next die in the sequence, as shown at 242 in FIG. 9.

Figure 10:
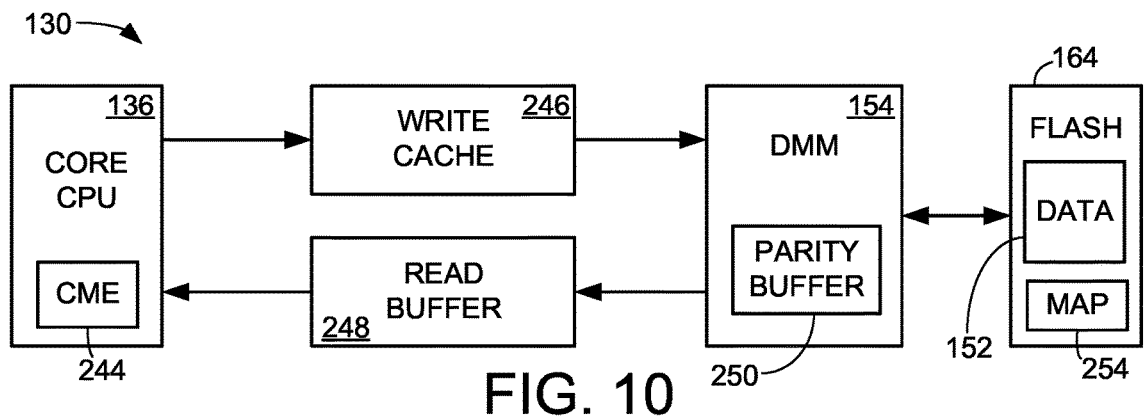
FIG. 10 shows a functional block representation of an example data storage device configured in accordance with some embodiments.

FIG. 10 shows a functional block representation of additional aspects of the SSD 130. The core CPU 136 from FIG. 3 is shown in conjunction with a code management engine (CME) 244 that can be used to manage the generation of the respective code words and outer code parity values for both standard and non-standard parity data sets During write operations, input write data from the associated host are received and processed to form MUs 180 (FIG. 5) which are placed into a non-volatile write cache 246 which may be flash memory or other form(s) of non-volatile memory. The MUs are transferred to the DMM circuit 154 for writing to the flash memory 164 in the form of code words that contain user data, inner code, and outer code. During read operations, one or more pages of data are retrieved to a volatile read buffer 248 for processing prior to transfer to the host.

The CME 244 determines the appropriate inner and outer code rates for the data generated and stored to memory. In some embodiments, the DMM circuit 154 may generate both the inner and outer codes. In other embodiments, the DMM circuit 154 generates the inner codes (see e.g., LDPC circuit 160 in FIG. 3) and the core CPU 136 generates the outer code words. In still other embodiments, the same processor/controller circuit generates both forms of code words. Other arrangements can be used as well. The CME 244 establishes appropriate code rates for both types of code words.

During generation of the outer codes, a parity buffer 250 may be used to successively XOR each payload being written during each pass through the dies. Both payload data 252 and map data 254 will be stored to data locations in flash 164.

Figure 11:
FIG. 11 displays a block representation of portions of an example data storage device arranged in accordance with assorted embodiments.
Figure 11:

FIG. 11 is a block representation of portions of an example data storage device 260 in which data is arranged into a plurality of code words 262 that can efficiently be stored, and retrieved, from one or more SSD storage destinations. A page 150 of data may comprise a number of consecutive, or non-consecutive, code words 262 organized to effectively fit in the available space of an SSD.

As shown, a code word 262 can consist of user data 264 and inner code 266 generated to complement the user data 264, such as by the LDPC circuitry 138. The inner code 266 can provide a diverse variety of capabilities, such as error correction via error correction code (ECC), data status, data offset, and other data control information. The combination of user data 264 and inner code 266 together in a code word 262 allows for efficient analysis, verification, and correction (if necessary) of errors in reading, or writing, the user data 264 to/from memory. However, the inner code 266 may be insufficient, in some cases, to overcome and/or correct errors associated with storage of the code word 262. Hence, various embodiments generate outer code that provides higher-level data analysis and correction in complementary fashion to the inner code 266.

Figure 12:
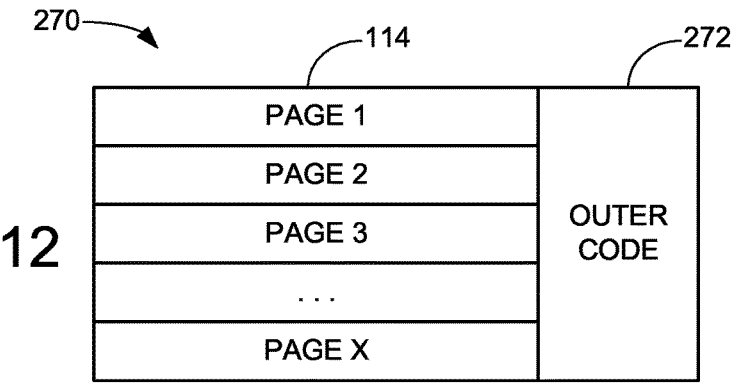
FIG. 12 shows a block representation of portions of an example data storage device configured in accordance with various embodiments.

FIG. 12 conveys a block representation of a portion of an example data storage device 270 where pages 150 of code words 262 are stored in combination with outer code 272 in accordance with some embodiments. The outer code 272 may be associated with one or more pages 150 of code words to provide data that describes the constituent code words 262 and allows for verification and correction of the accuracy, and reliability, of the user data of the respective code words 262.

It is contemplated that the outer code 272 can operate to correct errors and faults that occur during the reading, or writing, of the code words 262. Such corrective function of outer code 272 allows user data to be retrieved despite encountered errors/faults that were uncorrectable by inner code 266. In some embodiments, a probation counter for the user data and/or the physical address of memory where the user data 264 is stored is maintained in the inner code 266, outer code 272, or elsewhere in memory to allow a physical address and/or user data to be monitored in real-time with simple polling of the probation counter.

Figure 13:
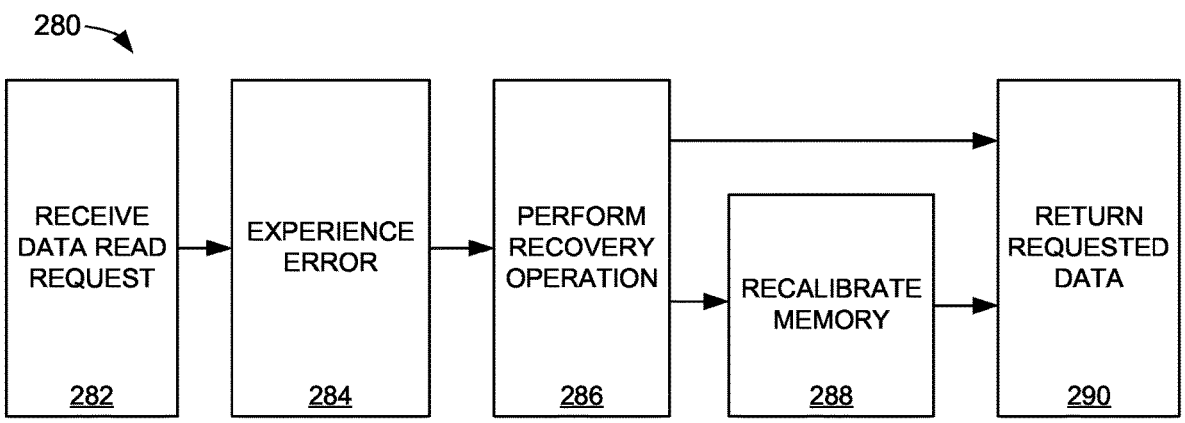
FIG. 13 conveys an example timeline in which various embodiments are practiced.

FIG. 13 conveys an example timeline of events 280 that can occur in an SSD 130 in some embodiments. After the SSD 130 is configured and initialized to be ready to conduct data access operations as part of a distributed data storage system, one or more data read requests are received in step 282 from one or more connected hosts, network nodes, or other data storage devices. Execution of accessing the requested data encounters an error in step 284. This error may be any type, location in the system, severity, or cause.

Due to the presence of code, protocol, and procedures stored in one or more portions of the distributed data storage system, step 286 performs a repair operation to overcome the encountered error and allow future accurate accesses to the data storage memory location. That is, the repair operation of step 286 can reconstruct, or otherwise make accessible, the stored data itself and/or the memory location where the data is stored. While effective, such repair operation(s) in step 286 can occupy valuable time and system processing capabilities. It is contemplated that the repair operation(s) of step 286 may render one or more data memory locations uncalibrated. If so, step 288 performs one or more calibration operations that allow reliable and consistent data retrieval. However, such operations further exacerbate the use of system resources to overcome an encountered error.

Once the data and/or data location in memory have been repaired, step 290 then returns the requested data. Although partial or complete copies of data may be resident elsewhere to allow the data request to be satisfied before data and/or a data location is repaired, the unintelligent copying of data proactively can delay and otherwise increase processing complexity unnecessarily. Hence, assorted embodiments of a data storage device and distributed data storage system utilize a hot data module to intelligently perform proactive data copying to allow data read requests to be satisfied despite the occurrence of an error, but without unduly occupying system resources or adding data operations that can reduce the usable lifespan of memory, particularly flash memory that has a finite number of reads/writes before becoming unreliable and unrepairable.

Figure 14:
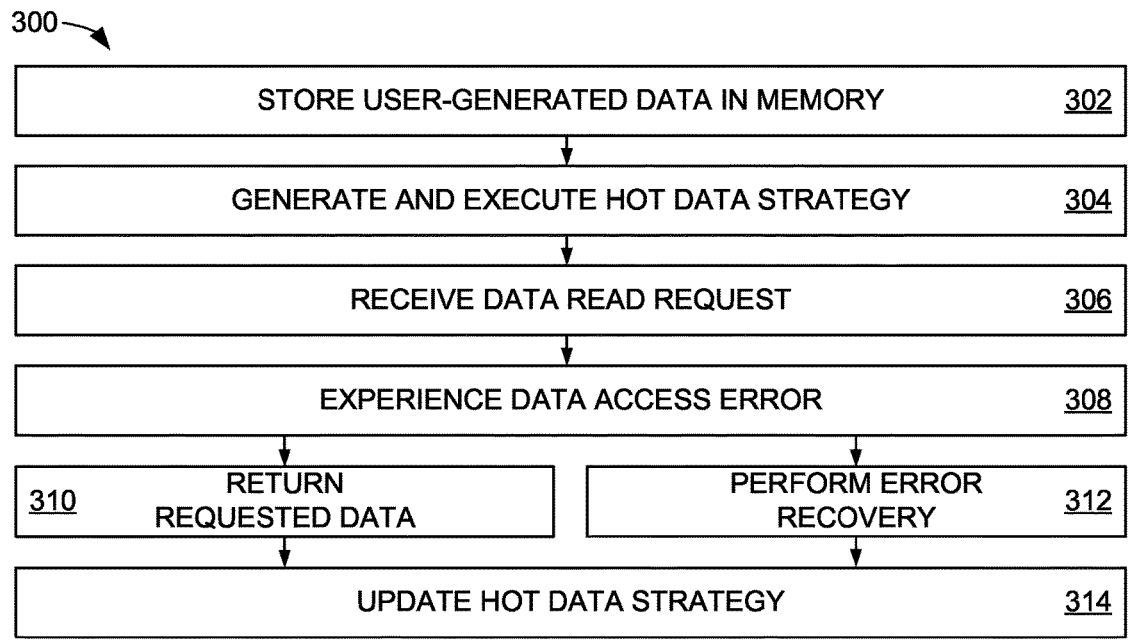
FIG. 14 depicts an example timeline of hot data management carried out in accordance with some embodiments.

FIG. 14 depicts an example timeline 300 that can be performed with a distributed data storage system configured and operated in accordance with various embodiments. Any number of data write requests in step 302 are satisfied by storing user-generated data to one or more physical addresses of at least one memory. At any time before, during, or after the storage of user-generated data in a memory, step 304 generates a hot data strategy with a hot data module that prescribes at least a variety of events and activities that trigger data to be labeled "hot" and to be copied to other portions of the distributed data storage system.

The hot data strategy is then executed while a data read request is received in step 306 from a host, network node, or data storage device. The execution of the hot data strategy can evaluate numerous different types of past, current, and predicted conditions related to the satisfaction of the received data read request to determine if currently stored data is to be copied to a different location in the distributed data storage system. While no hot data triggering events may cause data to be duplicated according to the strategy generated in step 304, the example scenario of timeline 300 has at least one hot data triggering event occur that prompts the data of the read request to be proactively copied to a different physical data address of the distributed data storage system.

When the system attempts to satisfy the read request from step 306, an error occurs that prevents the reliable, accurate retrieval of data from a logical block address corresponding to a physical memory address. In accordance with the hot data strategy, step 310 can return the requested data from the alternate copy stored in a different memory location, perhaps with a different logical block address, while step 312 begins performing error recovery operations on the data and/or physical memory address that erred. It is noted that the error recovery operations of step 312 are not required to coincide with the delivery of the alternated data copy in step 310 and can be scheduled to occur continuously, or sporadically, when deemed efficient by a hot data module.

With the requested data being returned to complete the data access request, step 314 proceeds to update the hot data strategy with information about both the data read activity as well as the encountered error. The execution of the existing hot data strategy handled an encountered error in timeline 300, but can also optimize the utilization of physical and logical memory channels, balance the data access load on assorted memories of a distributed data storage system, and mitigate the effects of read disturb and other operational consequences that can degrade data storage performance for a memory.

Figure 15:
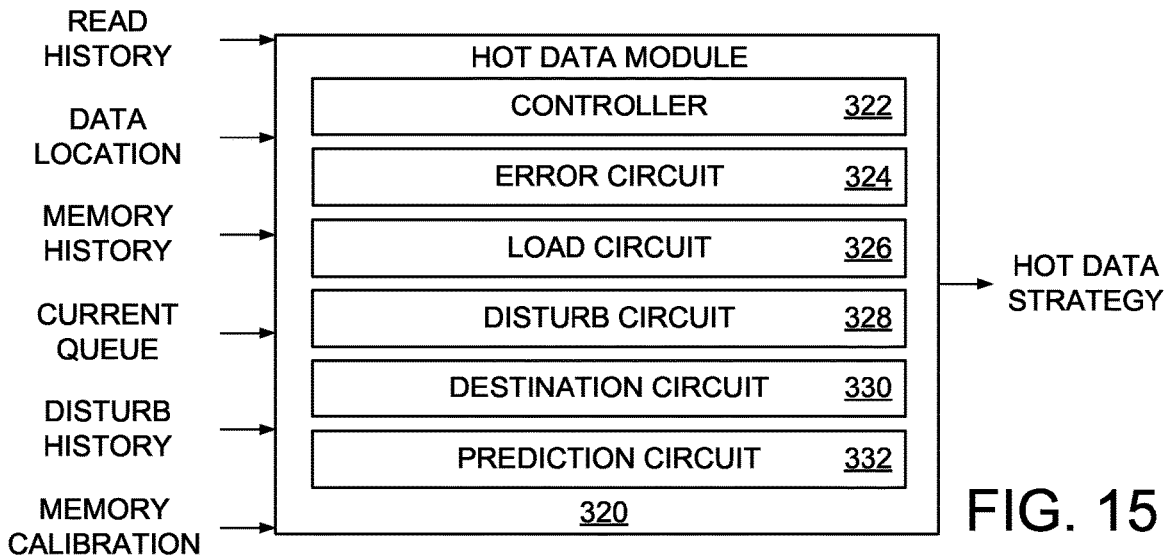
FIG. 15 is a block representation of an example hot data module that can be utilized by the various embodiments of FIGS. 1-14 in accordance with various embodiments.

FIG. 15 depicts a block representation of an example hot data module 320 that can be resident in software and hardware in various portions of a distributed data storage system, such as in a host, network node, or data storage device. The module 320 can employ one or more controllers 322, which can be any programmable circuitry, such as a microprocessor or application specific integrated circuit (ASIC). The module controller 322 can direct the input of any number and type of system information, as shown, to generate one or more hot data strategies to intelligently identify data that is hot and deserves to be copied elsewhere in the system and to intelligently copy data in order to mitigate the processing, capacity, and performance degradation inherent in copying data to multiple locations in a data storage system.

The module controller 322 can operate alone and in conjunction with an error circuit 324 to generate one or more hot data triggering events for the hot data strategy that prompt the copying of data from one or more of the input information. The error circuit 324 can proactively identify event to trigger data copying from a diverse, and non-limiting, number of data storage conditions, such as high data read frequency to a physical memory region, past history of high physical data address errors, physical proximity of logical block addresses in memory, read frequency of a logical data address, and the types of memory cells (MLC/TLC/SLC). The ability to proactively identify when, and at what physical block addresses, data access errors will occur, along with the ability to identify data access loads, read disturb, and data channel usage, allows the error circuit 324 and module controller 322 to incorporate quick adaptations to actual and likely errors and data storage performance degrading conditions.

The identification of hot data triggering events with the error circuit 324 can be complemented by the load circuit 326, which identifies the current and pending workload for various portions of a data storage system. The load circuit 326 can inform the module controller 322 how queued data access requests, as well as current buffer and cache capacities, will contribute to the accessing of data in the future. That is, the load circuit 326 can identify current and future workload imbalance among various channels, memories, devices, dies, GCUs, and pages to allow the module controller 322 to place one or more triggers and/or data copying procedures to prevent, or mitigate the degrading effects of, such workload imbalance. It is contemplated that the load circuit 326 further monitors the data access frequency for assorted physical block addresses, which can identify when data are accessed often and can correspond with errors and other performance degradations.

With the physical structure of many solid-state memories, particularly flash-type memory cells, the electrical interaction with a memory cell can temporarily disturb the data storage operation of physically adjacent memory cells. A disturb circuit 328 of the hot data module 320 can translate the physical layout of physical data addresses with logical block addresses to determine which memory cells are in jeopardy of experiencing read disturb conditions and inaccurate data accesses when separated addresses are electronically activated. For instance, the disturb circuit 328 can identify when a read disturb error will occur and can incorporate that circumstance as a hot data triggering event in the hot data strategy.

While various aspects of the hot data module 320 can be directed at intelligently identifying when data is to be copied in response to being labeled "hot data," the module 320 can additionally incorporate intelligence into the hot data strategy to conduct actual data copying. A destination circuit 330 can provide such intelligence by selecting the location of copied data. For instance, the destination circuit 330 can evaluate the likelihood of errors, read disturb conditions, and data access inefficiencies to prescribe optimal destinations for copies of existing data in the hot data strategy. It is noted that the destination circuit 330 can proactively generate new logical block addresses for copied data as well as mapping, table, or forward pointer tracking into the hot data strategy, which reduces the processing necessary to carry out the copying of data upon a hot data triggering event.

The destination circuit 330 may, in some embodiments, prescribe the copying of data into different types of memory cells. For example, data resident in a multi-level cell may be assigned to be copied, upon a triggering event, to a single-level cell, or vice-versa. The hot data strategy may specifically assign different memory die, pages, GCUs, or data storage devices for copied versions of data depending on the current and pending data access and data maintenance activity evaluated by the destination circuit 330.

Copied data in the hot data strategy is not limited to utilizing different physical memory destinations. The destination circuit 330 may prescribe changing various aspects of the data being copied to optimize the storage and retrieval of the copied data in response to a hot data triggering event. Although not limiting, the destination circuit 330 can incorporate different error correction codes, no error correction codes, reduced recovery codes, no recovery codes, encryption, compression, and assigned device-level processor handling into the hot data strategy to allow retrieval of the copied data to be optimized for efficiency and without unduly occupying memory capacity. The ability to utilize different forms of original data in a copy version minimizes the processing and retrieval of the data copy, when necessitated by an error occurring in the retrieval of the original data.

The hot data module 320 can employ a prediction circuit 332 to create and/or test hypothetical data storage and retrieval situations by execution of assorted hot data strategy actions. The prediction circuit 332 can be configured to forecast when errors will occur, the processing time it would take to recover from an encountered error, and if such processing time would be improved by retrieving data from a copied location. The prediction circuit 332 may be utilized to evaluate present hot data strategy actions to ensure optimal hot data triggering events and copied data destination configurations. That is, the prediction circuit 332 can periodically assess how the current hot data strategy would result based on current system conditions, which allows the module controller 322 to proactively alter the hot data strategy to provide optimized triggering events as well as how and where copied data is stored.

As a result of the operation of the hot data module 320, an intelligent and adaptive hot data strategy can efficiently handle the occurrence of errors, balancing of workloads, presence of read disturb conditions, and data channel overuse with predetermined actions. The copying of data in response to selected times, as opposed to static or blanket copying of data, ensures valuable system processing and capacity are employing with the maximum chance to provide data retrieval improvements that can be measured as the difference in error recovery operations compared to retrieval of a copy version of data.

Figure 16:
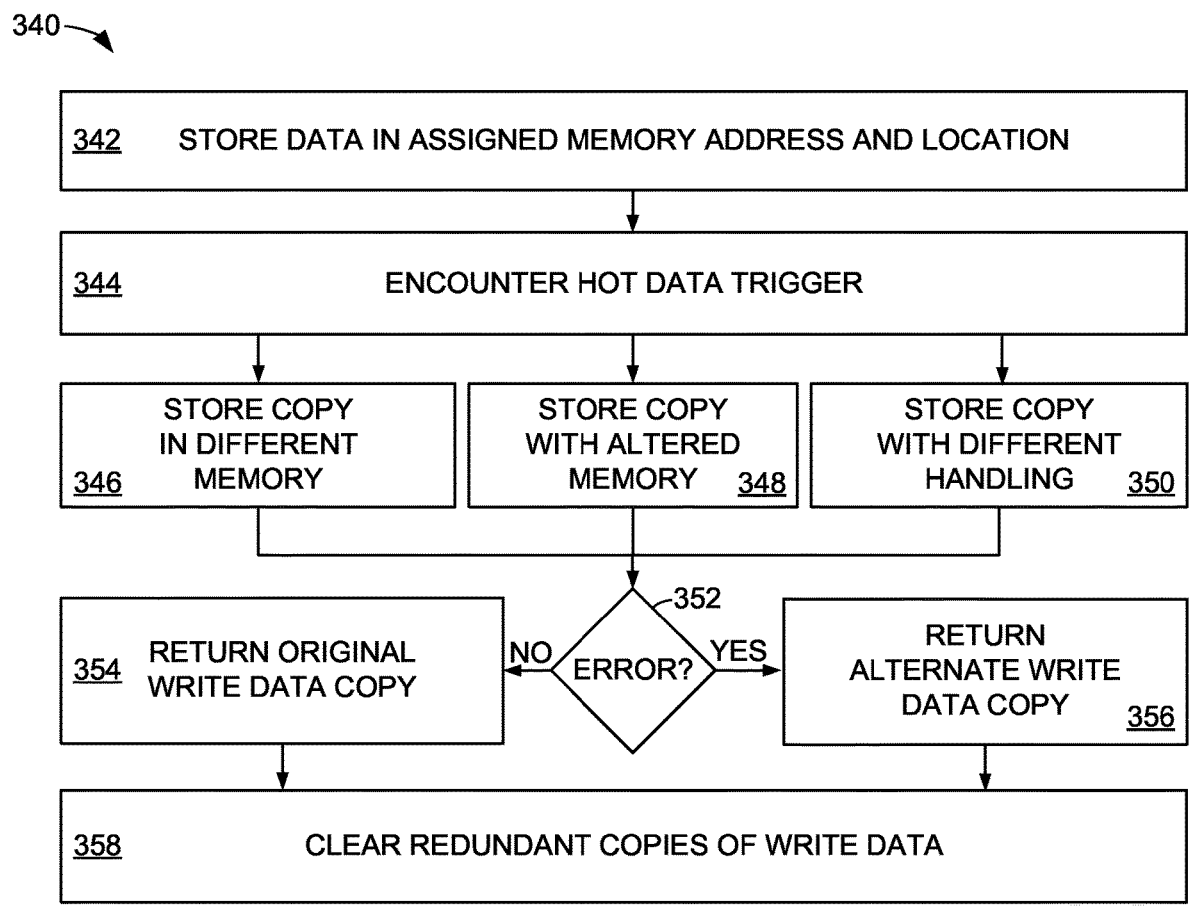
FIG. 16 is a flowchart of an example hot data routine that can be carried out by the assorted embodiments of FIGS. 1-15.

FIG. 16 depicts an example hot data routine 340 that can be conducted by the assorted embodiments of FIG. 1-15 as part of a distributed data storage system. The routine 340 begins with the generation of at least one hot data strategy with a hot data module located somewhere within a data storage system. It is contemplated that multiple different hot data strategies are concurrently active and capable of handling data storage activity differently, such as for different die, GCU, or data storage devices.

Regardless of the number of hot data strategies present, step 342 has user-generated data being stored to an assigned physical address in memory with an associated logical block address. The storage of such data in step 342 can be conducted at any time and is not contemplated to have any duplicates or data handling operations beyond the assignment of a memory location and the electrical storage of data in the memory corresponding to that location. At some time during or after the storage of data in step 342, one or more hot data triggers predetermined in a hot data strategy are encountered in step 344. It is noted that a hot data triggering event can be detected, or predicted, by the hot data module, which prompts the copying of data in accordance with the hot data strategy.

While not required or limiting, a hot data strategy employed in routine 340 can prescribe the storage of an exact copy of data in a different memory (step 346), storage of an exact copy of data in a memory cell that has been altered (step 348), or storage or a modified version of data in a different memory location (step 350). The ability to selectively execute the storage of a copy of data allows a distributed data storage system to quickly provide a copy of data without degrading the current or future data storage performance of a data storage device, memory, or collective system.

In step 346, a hot data module can direct a copy version of data to a particular location prescribed by a hot data strategy, such as a page, die, GCU, or device, or can direct the copy version simply to the first available memory location with the next user-generated data write, a cache location, or any memory having greater read latency. In step 348, a hot data module can alter the data itself, such as removing recovery and/or error correction codes, compressing data, or unencrypting data, or can alter the destination memory, such as changing the read calibration or the number of bits that can be stored in a cell, which can provide customized and optimized readback of the copy version at a later time. In step 350, a hot data module can alter the handling of a copy version compared to the original data version, such as turning error recovery off, removing security parameters, or making the copy version location more quickly activated than the original version of data.

Through the assorted capabilities of storing a copy of data proactively before an errors have occurred, a distributed data storage system can be more robust to encountered errors. Decision 352 evaluates if a data read error is occurring or is imminent. If not, a read request is satisfied in step 354 with the original version of write data being returned to a requestor. However, if an error has, or will, occur, step 356 returns the copy version of data from the alternate physical address selected and executed after the hot data trigger of step 344. After returning the original data version in step 354 or the alternate copy version of data in step 356, any current and past copies of data are cleared by the hot data module in step 358. It is contemplated that step 358 operates as a background operation at a time prescribed by the hot data strategy and executed by the hot data module, such as during low system data access volume, high system processing capabilities, other garbage collection operations, or when a recovery or recalibration is conducted on a page/die/ memory.

Through the assorted embodiments of a hot data module, intelligence can be inserted into what data is copied, where a copy version of data is stored, and how a copy version of data compares to the original version. The duplication of data can optimize error recovery, data channel usage, read disturb conditions, and balance data request workloads. The ability to employ different memories, memory cell types, error correction codes, and data handling allows a hot data strategy to adapt to current and predicted data storage conditions to provide optimized data retrieval and error recovery that is seamless to a host.

A data storage system may have a write manager that replicates write data to two different locations in a non-volatile memory in response to hot data assignment by a hot data module with a first copy of the write data having a first error correction code and a second copy of the write data having a second error correction code. A read manager can initiate a first read operation in an effort to retrieve the first copy of write data in response to a read command from the host before aborting the effort to retrieve the first copy of the write data and retrieving the second copy of the write data in response to an encountered error.

What is claimed is:

1. An apparatus comprising a non-volatile memory (NVM) connected to a controller of a data module, the controller configured to implement a hot data strategy by identifying, as hot data, a selected data set at a first memory location in the NVM, by proactively replicating the selected data set identified by the hot data strategy to a second memory location in the NVM prior to an error reading the identified data from the first memory location, and by processing a subsequently received data read request for the selected data set by directing the data read request to the second memory location, aborting the data read request from the second memory location responsive to an occurrence of an error in reading the selected data set from the second memory location, and redirecting the data read request to the first memory location, the second memory location configured to have a second read response characteristic that is different than a first read response characteristic of the first memory location.

2. The apparatus of claim 1, wherein the selected data set stored in the first memory location in the NVM is protected by a first error correction code having a first strength, and the selected data set stored in the second memory location in the NVM is protected by a second error correction code having a lower second strength.

3. The apparatus of claim 1, wherein the selected data set stored in the first memory location in the NVM is stored in a first group of memory cells each storing multiple bits per cell, and the selected data set stored in the second memory location in the NVM is stored in a second group of memory cells each storing a single bit per cell.

4. The apparatus of claim 1, wherein the selected data set stored in the second memory location is protected with a set of reduced recovery codes as compared to the selected data set stored in the first memory location.

5. The apparatus of claim 1, wherein the NVM is a flash memory and the first and second memory locations are different garbage collection units (GCUs) that extend across different die sets within the NVM and have different error rate and read rate responses.

6. The apparatus of claim 1, wherein the hot data strategy utilizes a plurality of different triggers to identify a physical block address as constituting data to be replicated to the second memory location.

7. The apparatus of claim 1, wherein the hot data strategy uses at least one trigger that predicts future data accesses to a physical block address in the non-volatile memory.

8. The apparatus of claim 1, wherein the hot data strategy uses at least one trigger that estimates a number of errors for a physical block address in the non-volatile memory.

9. The apparatus of claim 1, wherein the hot data strategy uses at least one trigger that evaluates physical proximity of logical block addresses of data blocks stored in the NVM.

10. A method comprising:
storing a first data block generated by a host in a non-volatile memory (NVM), connected to a data module, the first data block having a first data configuration;
generating a hot data strategy using the data module in response to the storage of data to the NVM, the hot data strategy generated responsive to at least one trigger associated with identifying the first data block as hot;
replicating the first data block from a first memory location in the NVM to a different, second memory location in the NVM with a second data configuration prior to an error reading the first data block from the first memory location, the first data configuration being different than the second data configuration; and
processing a subsequently received data read request for the first data block by directing a first read operation upon the second memory location, aborting the first read operation prior to completion thereof responsive to an occurrence of a read error and directing a replacement second read operation upon the first memory location to retrieve the first data block from the first memory location.

11. The method of claim 10, wherein the second data configuration has a different error correction code strength as compared to an error correction code strength of the first data configuration.

12. The method of claim 10, wherein the second data configuration has a different encryption scheme as compared to an encryption scheme of the first data configuration.

13. The method of claim 10, wherein the second data configuration has no security parameters while the first data configuration has security parameters.

14. The method of claim 10, wherein the at least one trigger is a read disturb condition.

15. The method of claim 14, wherein the read disturb condition is predicted by the data module.

16. The method of claim 10, wherein the hot data strategy prescribes a plurality of different destinations for the replication of data and the controller selects one of the plurality of destinations in response to current detected data storage performance in the (NVM).

17. A method comprising:
using a controller of a data module to store data from a host device to a non-volatile memory (NVM);
identifying a selected data set as hot data responsive to a detected level of interest in the selected data set from the host device, the selected data set stored in a first memory location within the NVM having a first error correction code (ECC) protection scheme;
replicating the selected data set in a different, second memory location within the NVM having a weaker, second ECC protection scheme;
subsequently receiving a data read request from the host device for the selected data set;
processing the data read request by directing a first read operation upon the second memory location, aborting the first read operation prior to completion thereof responsive to an occurrence of a read error, and directing a replacement second read operation upon the first memory location to retrieve the first data block from the first memory location.

18. The method of claim 17, wherein the first memory location in the NVM is configured to have a first read recovery time and the second memory location in the NVM is configured to have a second read recovery time that is faster than the first read recovery time.

19. The method of claim 18, wherein the first memory location comprises flash memory cells that each store multiple bits and the second memory location comprises flash memory cells that each store just a single bit.

20. The method of claim 17, wherein the NVM is a flash memory, the first memory location is a first garbage collection unit (GCU) that extends across a first set of semiconductor memory dies with a first read error rate and a first read latency, the second memory location is a second GCU that extends across a second set of semiconductor memory dies with a second read error rate and a second read latency, and wherein the first read error rate is better than the second read error rate, and the second read latency is faster than the first read latency.

* * * * *